Aug. 14, 1962     H. F. ANDERSON     3,048,948
MACHINE FOR SIZING COMBINED EXPANDER AND SPACER
Filed July 5, 1960
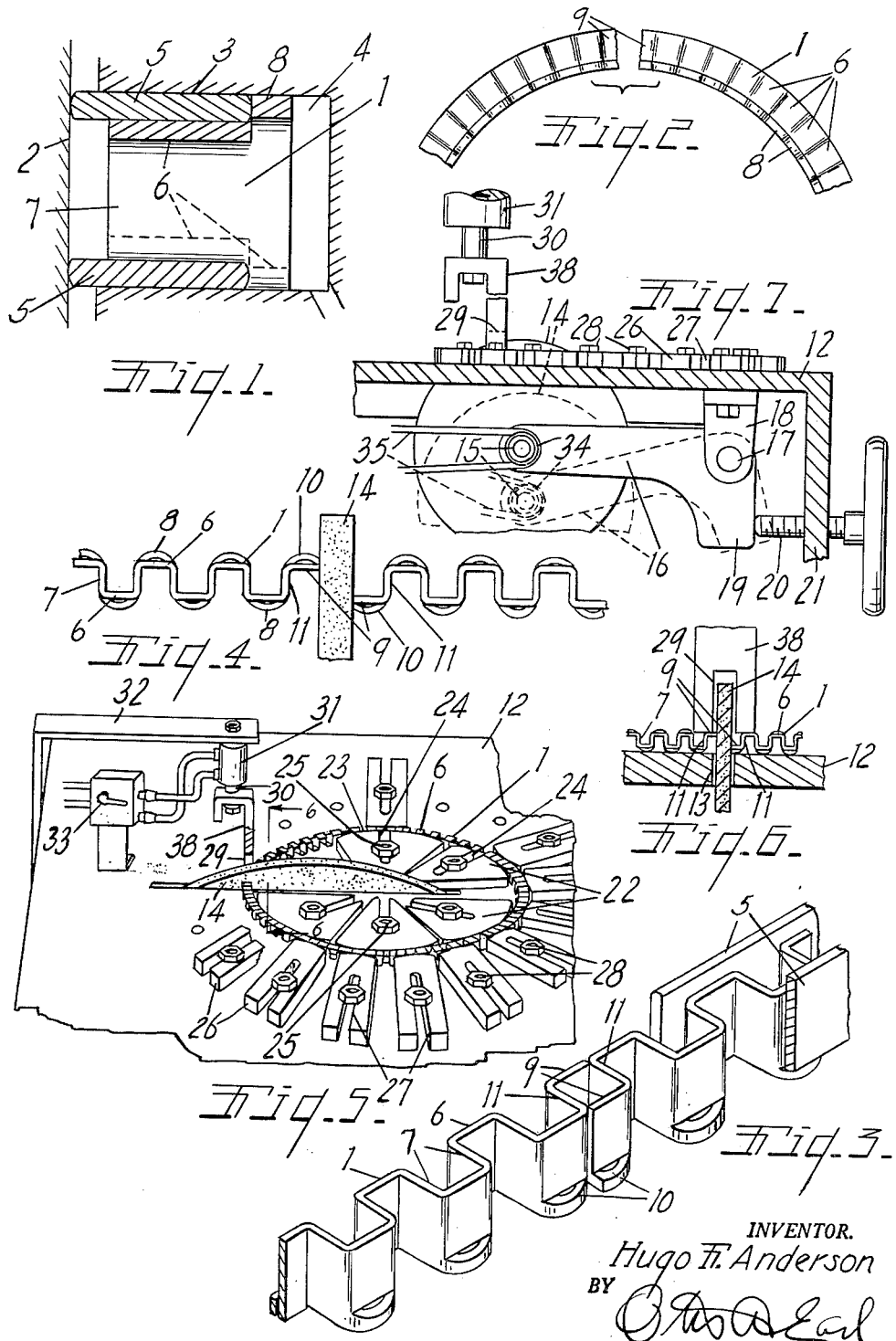
INVENTOR.
Hugo F. Anderson
BY
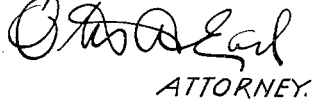
ATTORNEY.

United States Patent Office 3,048,948
Patented Aug. 14, 1962

3,048,948
MACHINE FOR SIZING COMBINED EXPANDER AND SPACER
Hugo F. Anderson, Hastings, Mich., assignor to Hastings Manufacturing Company, Hastings, Mich.
Filed July 5, 1960, Ser. No. 40,823
10 Claims. (Cl. 51—98)

This invention relates to a machine for sizing annular split elements and finishing the ends thereof.

The main objects of this invention are:

First, to provide a machine for sizing and finishing the ends of annuual split combined spacer and piston ring support members.

Second, to provide a machine for sizing and finishing the ends of springable annular members such, for example, as piston ring element spacers and expanders which may be readily adjusted to work of varying diameters and when adjusted to work of one diameter permits the rapid positioning and removal of the work and machining thereof.

Third, to provide a machine of the class described which is of large capacity and at the same time produces very accurate work.

Fourth, to provide a machine having these advantages which may be efficiently operated by others than skilled mechanics and without danger of injury to the operator.

Objects relating to details and economies of the invention will appear from the description to follow. The invention is defined and pointed out in the claims.

A preferred embodiment of the invention is illustrated in the accompanying drawing, in which:

FIG. 1 is a fragmentary sectional view of a piston ring assembly in which the combined expander and spacer member has been sized and finished by the use of a machine embodying my invention.

FIG. 2 is a fragmentary side elevational view thereof of the combined expander and spacer member of FIG. 1.

FIG. 3 is a fragmentary perspective view of a piston ring assembly in which the combined spacer and expander element has been sized and finished by use of the machine of my present invention with the machined ends in abutting engagement as in use.

FIG. 4 is an enlarged fragmentary view illustrating one of the steps in the use of my invention.

FIG. 5 is a fragmentary perspective view of a machine embodying my invention with a piece of work conventionally illustrated thereon, certain of the parts being omitted and others partially broken away.

FIG. 6 is an enlarged fragmentary vertical section on a line corresponding to line 6—6 of FIG. 5.

FIG. 7 is a fragmentary view in which the bed member is shown in vertical section illustrating certain steps in the use of manipulation of the machine.

I have illustrated my invention in an embodiment thereof particularly designed for the finishing and sizing of the combined spacer and expander, having certain features disclosed in the Phillips Patent 2,656,230, issued October 20, 1953. The work is designated by the numeral 1. To show its relationship in use to other parts I have illustrated, as conventionally shown in FIG. 1, a cylinder 2, piston 3 having a piston ring groove 4 therein. The piston ring members 5 are desirably formed of ribbon steel coiled edgewise.

The combined spacer and expander member 1 is formed of ductile ribbon metal corrugated sidewise and disposed radially edgewise between the cylinder engaging elements 6. This corrugating results in the alternately disposed ring supporting bights and connecting reaches 7. The bight portions having ring supporting lugs 8 projecting laterally therefrom to provide radial supports for the ring, as is illustrated in FIG. 1.

As stated, this combined spacer and expander member is substantially that shown in the Phillips Patent 2,656,-230. However, it should be understood that the machine of my invention is adapted for sizing and finishing or smoothing the ends of other forms of split annular members, but is particularly desirable for use in producing combined expander and spacer members which have abutting end portions and which are under spring stress when installed. The abutting ends of the combined spacer and expander illustrated are not like those illustrated in the Phillips Patent 2,656,230 but are those illustrated in my application for patent Serial No. 40,824, filed July 5, 1960, now patent No. 2,970,022, issued January 31, 1961, in which both ends terminate in bight portions 9 having cylinder ring piston ring supporting lugs 10 on their lower edges, the bight portions 9 at one end abutting the end cross reach 11 of the other end, see FIG. 3.

The bed member 12 is provided with a flat work supporting face or surface having a slot 13 therethrough and of such length as to permit the projection therethrough of the cutter member 14, the cutter illustrated being disc-like and of grinding material having abrasive peripheral side and surfaces. This cutter is journaled at 15 on the swingable support 16 which is pivoted at 17 on the hanger 18. The support member 16 is provided with a downwardly projecting arm 19 which is engaged by the manually adjustable screw 20 disposed through the side member 21 of the bed member 12.

The bed member of the machine is adapted for work of varying diameters and it is important that the work be accurately positioned so that it is sized and finished to meet use requirements. To that end I provide an annular series of inner work holder members 22 formed of generally triangular shape and provided with outwardly curved peripheral face portions 23 and having radial slots 24 therein through which the anchoring bolts designated by the numeral 25 project, the bolts being provided with clamping nuts on their upper ends.

The outer series of work holder members 26 are arranged in an annular series radially relative to the work and are provided with longitudinal slots 27 through which the clamping bolts 28 are disposed. The details of the bolts are not illustrated as they will be understood, the purpose being to adjustably secure these inner and outer work holder members to the bed member relative to each other, as illustrated in FIG. 5. In use the inner work holder members 22 and the outer work holder members 26 are adjustable and adapted to be adjusted to receive and support work of varying diameter positioned between them on the bed member 12, as is illustrated in FIG. 5, with the ends of the work positioned above the cutter slot in the bed member. The ends of the work are then clamped upon the bed member by the work clamp 38 which has a vertical cutter receiving slot 29 therein aligned with the slot 13 in the bed member. The work is thus securely held so it is not distorted or twisted out of shape while being operated upon by the cutter. It should be understood that while the applicant's machine is adapted for work of a wide range of diameters the work of all these ranges is securely held from distortion. It should be understood further that it is common practice to machine large quantities at each setting of work.

In the embodiment illustrated the clamping member 38 is supported by the piston designated generally by the numeral 30 and cooperating cylinder 31 mounted on the bracket 32 which overhangs the bed member. In the embodiment illustrated the clamp member is pneumatically operated the manual control means 33 being conventionally illustrated, see FIG. 5. The cutter is provided with a pulley 34 driven by the belt 35. The source of power is not illustrated.

The supporting and adjusting means for the cutter support 16 in the embodiment illustrated is in the form of a screw. After the work is positioned and the clamp actuated the cutter is advanced through the slot by manipulation of the screw 20. It will be understood that it is contemplated that in practice various devices may be used to actuate the cutter to and from cutting position.

It should be understood that the work holder members may be adjusted to receive work of different diameter and that the work is dropped between the inner and outer holder members, that is, it is not clamped by them but the ends of the work that are to be cut or trimmed are clamped on the bed member. This enables the very rapid inserting and removal of the work. The machine may be efficiently operated by others than skilled mechanics.

I have illustrated and described a practical embodiment of my invention. I have not attempted to illustrate other embodiments or adaptations which I contemplate as it is believed the disclosure made will enable those skilled in the art to embody or adapt the invention as may be desired.

Having thus described the invention, what is claimed as new and desired to secure by Letters Patent is:

1. A machine of the class described comprising a bed member having a planar work supporting surface having a slot therethrough, a driven cutter having parallel sides and having peripheral and side grinding surfaces, said bed member having a bracket on its underside, a support member for said cutter pivotally mounted on said bracket and provided with a journal at its swinging end, manually controlled means for adjusting said support member to project said cutter through and retract it from said slot, a plurality of outwardly facing inner workholder members disposed in an annular series relation to each other, a plurality of inwardly facing outer workholder members disposed in an annular series to each other and in opposed relation to said inner workholder members to receive and axially support an annular workpiece therebetween, each of said inner and outer workholder members being provided with radial slots, said bed member having bolts projecting through said radial slots and provided with workholder member clamping nuts, a bracket disposed in overhanging relation to said bed member, a work clamp mounted on said bracket for vertical adjustment relative to the workpiece and having a downwardly facing slot therein adapted to receive said cutter when projected above said bed member, and manually controlled means for actuating said clamp.

2. A machine of the class described comprising a bed member having a planar work supporting surface having a slot therethrough, a driven cutter, a support member for said cutter, means for adjusting said support member to project said cutter through and retract it from said slot, a plurality of outwardly facing inner workholder members disposed in an annular series relation to each other, a plurality of inwardly facing outer workholder members disposed in an annular series to each other and in opposed relation to said inner workholder members to receive and axially support an annular workpiece therebetween, each of said inner and outer workholder members being provided with radial slots, said bed member having bolts projecting through said radial slots and provided with workholder member clamping nuts, a bracket disposed in overhanging relation to said bed member, a work clamp mounted on said bracket for vertical adjustment relative to the workpiece and having a downwardly facing slot therein adapted to receive said cutter when projected above said bed member, and manually controlled means for actuating said clamp.

3. A machine of the class described comprising a bed member having a work supporting surface, a cutter reciprocably mounted so that a portion thereof may be projected above and retracted from the work supporting surface, a plurality of inner workholder members disposed in an annular series relation to each other, a plurality of outer workholder members disposed in an annular series relation to each other and in opposed radial relation to said inner workholder members to receive and axially support an annular workpiece disposed therebetween, each of said inner and outer workholder members being provided with radial slots, said bed member having bolts projecting upwardly therefrom through said slots and provided with workholder member clamping nuts, a work clamp having a downwardly facing slot therein adapted to receive said cutter when the clamp is in actuated position and said cutter is projected through said bed member, manually controlled means for actuating said clamp, and manually controlled means for advancing and retracting said cutter.

4. A machine of the class described comprising a bed member having a work supporting surface, a cutter reciprocably mounted so that a portion thereof may be projected above and retracted from the work supporting surface, a plurality of inner workholder members disposed in an annular series relation to each other, a plurality of outer workholder members disposed in an annular series relation to each other and in opposed radial relation to said inner workholder members to receive and axially support an annular workpiece disposed therebetween, a work clamp having a downwardly facing slot therein adapted to receive said cutter when the clamp is in actuated position and said cutter is projected through said bed member, manually controlled means for actuating said clamp, and manually controlled means for advancing and retracting said cutter.

5. A machine of the class described comprising a bed member having a work supporting surface having a slot therethrough, a driven cutter having parallel sides and having peripheral and side grinding surfaces, an adjustable support for said cutter mounted on the underside of said bed member, manually controlled means for adjusting said support to project said cutter through and retract it from said slot, a plurality of radially adjustable inner workholder members disposed in an annular series relation to each other, a plurality of radially adjustable outer workholder members disposed in an annular series to each other and in opposed relation to said inner workholder members to receive and axially support an annular workpiece therebetween, each of said inner and outer workholder members being provided with means for clamping it to said bed member, and a work clamp mounted for vertical adjustment relative to the workpiece and having a downwardly facing slot therein adapted to receive said cutter when projected above said bed member and adapted when in actuated position to clamp the workpiece upon the bed member on the sides of said cutter.

6. A machine of the class described comprising a bed member having a work supporting surface having a slot therethrough, a driven cutter, an adjustable support for said cutter, manually controlled means for adjusting said support to project said cutter through and retract it from said slot, a plurality of radially adjustable inner workholder members disposed in an annular series relation to each other, a plurality of radially adjustable outer workholder members disposed in an annular series to each other and in opposed relation to said inner workholder members to receive and axially support an annular workpiece therebetween, each of said inner and outer workholder members being provided with means for clamping it to said bed member, and a work clamp mounted for vertical adjustment relative to the workpiece and having a downwardly facing slot therein adapted to receive said cutter when projected above said bed member and adapted when in actuated position to clamp the workpiece upon the bed member on the sides of said cutter.

7. A machine of the class described comprising a bed member having a work supporting surface, a driven cutter having a peripheral and side grinding surfaces reciprocatingly mounted for adjustment to and from said surface, manually controlled means for adjusting said cutter to and from said work supporting surface, a plurality of radially adjustable inner workholder members disposed in annular series relation to each other, a plurality of radially adjustable outer workholder members disposed in opposed relation to said inner workholder members to receive and axially support an annular workpiece therebetween, said inner and outer workholder members being adjustable to receive and radially support work of varying diameters, and a work clamp means mounted for vertical adjustment relative to the workpiece disposed on said bed member between said inner and outer workholder members for clamping the workpiece to the bed member on opposite sides of said cutter.

8. A machine of the class described comprising a bed member having a work supporting surface, a driven cutter reciprocatingly mounted for adjustment to and from said surface, manually controlled means for adjusting said cutter to and from said work supporting surface, a plurality of radially adjustable inner workholder members disposed in annular series relation to each other, a plurality of radially adjustable outer workholder members disposed in opposed relation to said inner workholder members to receive and axially support an annular workpiece therebetween, said inner and outer workholder members being adjustable to receive and radially support work of varying diameters, and a work clamp means mounted for vertical adjustment relative to the workpiece disposed on said bed member between said inner and outer workholder members for clamping the workpiece to said bed member on opposite sides of said cutter.

9. A machine of the class described comprising a bed member having a work supporting surface, a driven cutter having peripheral and side grinding surfaces reciprocatingly mounted for adjustment to and from said surface, manually controlled means for adjusting said cutter to and from said work supporting surface, a plurality of inner workholder members disposed in annular series relation to each other, a plurality of outer workholder members disposed in opposed relation to said inner workholder members to receive and axially support an annular workpiece therebetween, and a work clamp means mounted for vertical adjustment relative to the workpiece disposed on said bed member between said inner and outer workholder members for clamping the workpiece to said bed member on opposite sides of said cutter.

10. A machine of the class described comprising a bed member having a work supporting surface, a driven cutter reciprocatingly mounted for adjustment to and from said surface, manually controlled means for adjusting said cutter to and from said work supporting surface, a plurality of inner workholder members disposed in annular series relation to each other, a plurality of outer workholder members disposed in opposed relation to said inner workholder members to receive and axially support an annular workpiece therebetween, and a work clamp means mounted for vertical adjustment relative to the workpiece disposed on said bed member between said inner and outer workholder members for clamping the workpiece to said bed member on opposite sides of said cutter.

References Cited in the file of this patent

UNITED STATES PATENTS

| 1,682,471 | Baumberger | Aug. 28, 1928 |
| 2,511,563 | Bullard | June 13, 1950 |

FOREIGN PATENTS

| 20,536 | Great Britain | Sept. 16, 1907 |
| 567,899 | Great Britain | Mar. 7, 1945 |
| 824,973 | France | Nov. 18, 1937 |